May 12, 1959
J. R. CONLISK ET AL
2,886,131
METHOD FOR THE RAPID ABSORPTION OF
SLIGHTLY SOLUBLE GASES BY LIQUIDS
Filed July 25, 1955
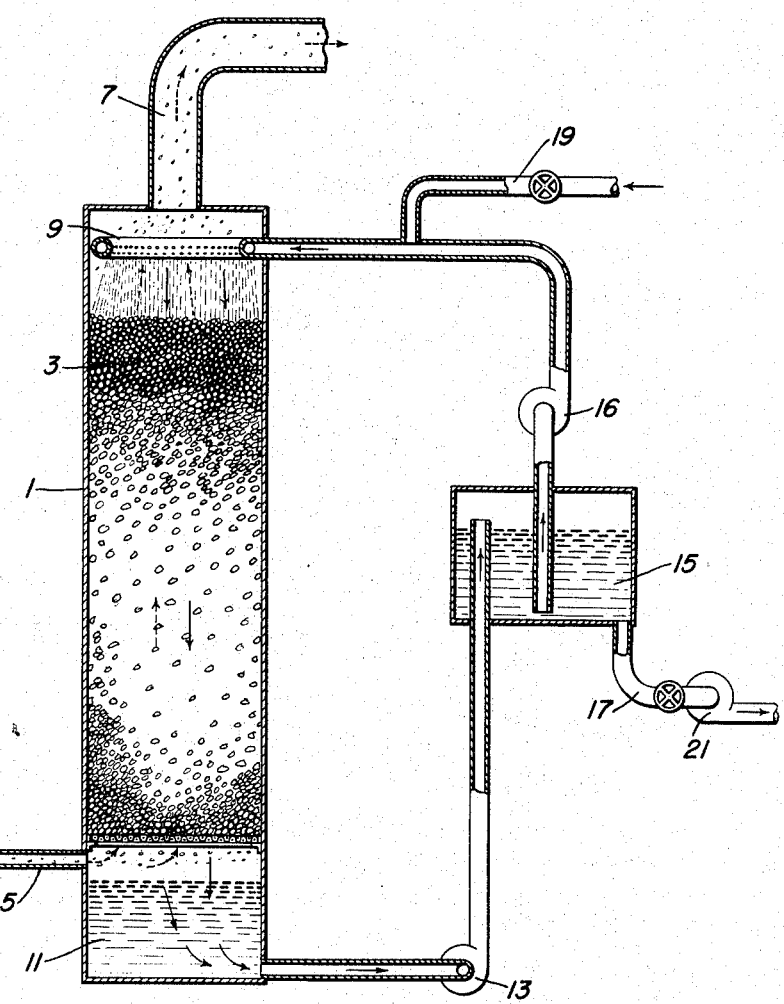
INVENTORS
John R. Conlisk
Charles B. Baker
BY *George Renehan*
ATTORNEY United States Patent Office 2,886,131
Patented May 12, 1959

2,886,131

METHOD FOR THE RAPID ABSORPTION OF SLIGHTLY SOLUBLE GASES BY LIQUIDS

John R. Conlisk, Darlington, Md., and Charles B. Baker, Clarksboro, N.J., assignors to the United States of America as represented by the Secretary of the Army Application July 25, 1955, Serial No. 524,312

5 Claims. (Cl. 183—114.2)

(Granted under Title 35, U.S. Code (1952), sec. 266)

The invention described herein may be manufactured and used by or for the Government of the United States of America for governmental purposes without the payment to us of any royalty thereon.

This invention relates to the absorption of slightly soluble high molecular weight organic gases in aqueous liquids.

An object of the invention is to increase the amount of gas that may be absorbed in a given amount of liquid and the rate of absorption.

The drawing consists of a diagrammatic illustration of one embodiment of our process.

In connection with gas shelters and similar fixed installations for protection against toxic gases, it is necessary to provide means for the continuous purification of large volumes of air. From the standpoint of economy and continuity of action, wet-type gas washers are highly desirable. However, the low solubliity in water of most common war gases such as chloropicrin and mustard gas, make it necessary to use unduly large amounts of liquid and also results in a low order of absorption.

We have found that by adding small amounts of finely divided activated carbon to aqueous liquids the amount of high molecular organic gas absorbed and the rate of absorption may be very materially increased.

Our process, therefore, comprises scrubbing air contaminated with high molecular weight gases with a suspension of finely divided activated carbon in an aqueous liquid. Only a small proportion of carbon is necessary to produce marked improvement, from one to five percent being ordinarily sufficient. The particle size of the carbon may range from about five to fifty microns. In these proportions and sizes the carbon forms a fairly stable and very fluid suspension which may be readily handled in conventional wet-type gas washers. In the absorption of mustard, chloropicrin, and other chlorine- or nitrogen- containing gases it is desirable to employ a dilute solution of a base, usually sodium hydroxide, as the aqueous liquid.

EXPERIMENTAL EXAMPLE

Using a single-stage bubbler-type laboratory absorber, the following results were secured:

Table 1

| contaminant | contaminant, mg./l. air | Percent Contaminant Absorbed | |
|---|---|---|---|
| | | by 2% solution, no carbon | NaOH in H₂O 2% activated charcoal |
| Mustard (ClCH₂CH₂)₂S | 0.5 | 80 | 98 |
| Chloropicrin CCl₃NO₂ | 2.0 | 2 | 22 |

In making the above tests the conditions such as gas flow, absorbent volume, etc., were of course maintained the same for comparative tests on the same gas.

It will be noted that the absorption of the chloropicrin was increased ten-fold. In general, the less soluble the organic gas, the greater the improvement obtained by the use of carbon.

The drawing shows diagrammatically one embodiment of our process. As the absorption apparatus we employ a tower 1 containing a packing 3 of Raschig rings, berl saddles, or the like. Contaminated air is introduced at 5 and purified air is withdrawn at 7. A suspension of activated charcoal in an aqueous liquid is introduced at the top of the tower through distributor 9, flows down through the packing 3 counter current to the flow of air, and is collected in sump 11. There it is withdrawn by pump 13 and delivered to surge tank 15. Pump 16 then returns it to distributor 9.

The suspension will, of course, eventually become saturated if it is not renewed. Valved conduits 17 and 19 are, therefore, provided for withdrawing used and adding fresh suspension, respectively. Periodically, pump 21 may be operated to withdraw the entire flow of used suspension while a corresponding amount of fresh suspension is introduced at 19. Alternatively, a certain proportion of the flow may be continuously diverted through conduit 17, an equal amount being continuously introduced at 19.

Other types of gas washers, e.g. bubble-cap columns and the various spray-type contacting devices may be employed. Naturally, the apparatus must be capable of handling the dilute suspension and the use of fine nozzles should therefore be avoided.

While we have described our process in some detail, it is obvious that various changes are possible. We therefore wish our invention to be limited only by the scope of the appended claims.

We claim:

1. A method of purifying air contaminated by small amounts of high molecular weight organic gases slightly soluble in water which comprises flowing said air in intimate contact with a dilute suspension of finely-divided activated carbon in an aqueous liquid.

2. A process as defined in claim 1 wherein said suspension comprises from 1 to 5% activated charcoal.

3. A method of purifying air contaminated with small amounts of mustard gas comprising flowing said air in intimate contact with a suspension of 1 to 5% activated charcoal in a dilute solution of sodium hydroxide in water.

4. A process for purifying air contaminated with small amounts of chloropicrin which comprises flowing said air in intimate contact with a suspension of from 1 to 5% activated charcoal in a dilute solution of sodium hydroxide in water.

5. A process for purifying air contaminated with a gas selected from the group consisting of mustard gas and chloropicrin which comprises flowing said air in intimate contact with a suspension of from 1 to 5% activated charcoal in a dilute solution of sodium hydroxide in water.

References Cited in the file of this patent

UNITED STATES PATENTS

| 214,412 | Lugo | Apr. 15, 1879 |
| 1,169,371 | Wense | Jan. 25, 1916 |
| 1,441,696 | McNeil | Jan. 9, 1923 |
| 1,605,897 | Liebknecht | Nov. 2, 1926 |
| 2,121,793 | Goshorn | June 25, 1938 |
| 2,612,434 | Rockwell et al. | Sept. 30, 1952 |
| 2,760,598 | Dietz et al. | Aug. 28, 1956 |
| 2,768,942 | Marple et al. | Oct. 30, 1956 |